US011527753B2

United States Patent
Kim et al.

(10) Patent No.: US 11,527,753 B2
(45) Date of Patent: Dec. 13, 2022

(54) SULFUR-CARBON COMPOSITE, METHOD FOR PREPARING SAME AND LITHIUM SECONDARY BATTERY COMPRISING SAME

(71) Applicant: LG CHEM, LTD., Seoul (KR)

(72) Inventors: Soohyun Kim, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 78 days.

(21) Appl. No.: 16/760,204

(22) PCT Filed: Oct. 29, 2018

(86) PCT No.: PCT/KR2018/012940
§ 371 (c)(1),
(2) Date: Apr. 29, 2020

(87) PCT Pub. No.: WO2019/088628
PCT Pub. Date: May 9, 2019

(65) Prior Publication Data
US 2021/0184215 A1    Jun. 17, 2021

(30) Foreign Application Priority Data
Oct. 30, 2017   (KR) .................. 10-2017-0142268

(51) Int. Cl.
*H01M 4/583* (2010.01)
*H01M 4/04* (2006.01)
(Continued)

(52) U.S. Cl.
CPC .......... *H01M 4/583* (2013.01); *H01M 4/0471* (2013.01); *H01M 4/38* (2013.01);
(Continued)

(58) Field of Classification Search
CPC .... H01M 2004/028; H01M 4/62; H01M 4/04; H01M 10/052; H01M 10/36;
(Continued)

(56) References Cited

U.S. PATENT DOCUMENTS

2014/0050992 A1    2/2014  Panchenko et al.
2014/0342233 A1*  11/2014  Guo ...................... H01M 4/133
                                                          429/231.4
(Continued)

FOREIGN PATENT DOCUMENTS

CN    103050689 A    4/2013
CN    105900268 A    8/2016
(Continued)

OTHER PUBLICATIONS

Machine translation of specification of CN107181004A (Year: 2017).*
(Continued)

*Primary Examiner* — Christina Chern
*Assistant Examiner* — Jason Barton
(74) *Attorney, Agent, or Firm* — Birch, Stewart, Kolasch & Birch, LLP

(57) ABSTRACT

A sulfur-carbon composite including a porous carbon material; and sulfur present in at least a part of pores of the porous carbon material and on an outer surface of the porous carbon material, wherein an inner surface and the outer surface of the porous carbon material are doped with a carbonate compound. Also, a positive electrode and a secondary battery including the same. Further, a method of preparing a sulfur-carbon composite and a method of preparing a positive electrode.

6 Claims, 4 Drawing Sheets

(51) Int. Cl.
  *H01M 4/38* (2006.01)
  *H01M 10/36* (2010.01)
  *H01M 4/02* (2006.01)
  *H01M 4/62* (2006.01)

(52) U.S. Cl.
  CPC ........... *H01M 4/623* (2013.01); *H01M 10/36* (2013.01); *H01M 2004/021* (2013.01); *H01M 2004/028* (2013.01); *H01M 2300/002* (2013.01); *H01M 2300/0028* (2013.01)

(58) Field of Classification Search
  CPC ...... H01M 4/625; H01M 4/139; H01M 4/362; H01M 4/583; H01M 4/0471; H01M 4/38; H01M 4/623; H01M 2300/002; H01M 2300/0028; H01M 2004/021; Y02E 60/10
  See application file for complete search history.

(56) References Cited

U.S. PATENT DOCUMENTS

| | | |
|---|---|---|
| 2014/0342234 A1 | 11/2014 | Guo et al. |
| 2015/0133569 A1 | 5/2015 | Gong et al. |
| 2016/0164103 A1* | 6/2016 | Son .................. H01M 10/0568 429/199 |
| 2016/0248087 A1 | 8/2016 | Kim et al. |
| 2017/0179478 A1 | 6/2017 | Bruckmeier et al. |
| 2018/0331352 A1* | 11/2018 | Morales Palomino ..................... H01M 4/1393 |

FOREIGN PATENT DOCUMENTS

| | | | |
|---|---|---|---|
| CN | 107181004 A * | 9/2017 | .......... H01M 10/052 |
| KR | 10-2015-0015644 A | 2/2015 | |
| KR | 10-2015-0053717 A | 5/2015 | |
| KR | 10-2016-0037084 A | 4/2016 | |
| KR | 10-2017-0012486 A | 2/2017 | |
| KR | 10-2017-0075969 A | 7/2017 | |
| WO | WO 2017/152171 A1 | 9/2017 | |

OTHER PUBLICATIONS

Wang, Xuefeng, et al. "Chemical adsorption: another way to anchor polysulfides." Nano Energy 12 (2015): 810-815 (Year: 2015).*
International Search Report issued in PCT/KR2018/012940 (PCT/ISA/210), dated Apr. 23, 2019.
Wu et al., "3D coral-like nitrogen-sulfur co-doped carbon-sulfur composite for high performance lithium-sulfur batteries", Scientific Reports, vol. 5, Art. No. 13340, 2015, pp. 1-10.
Yang et al., "Insight into the Effect of Boron Doping on Sulfur/Carbon Cathode in Lithium-Sulfur Batteries", ACS Applied Materials and Interfaces, vol. 6, 2014, pp. 8789-8795.
Extended European Search Report for European Application No. 188/4157.3, dated Oct. 27, 2020.
Li et al., "Nitragen-Doped MOF-Derived Micropores Carbon as Immobilizer for Small Sulfur Molecules as a Cathode for Lithium Sulfur Batteries with Excellent Electrochemical Performance", ACS Applied Materials & Interfaces. vol. 7, No. 7, Feb. 11, 2015, pp. 4029-4038.

* cited by examiner

[Figure 1]
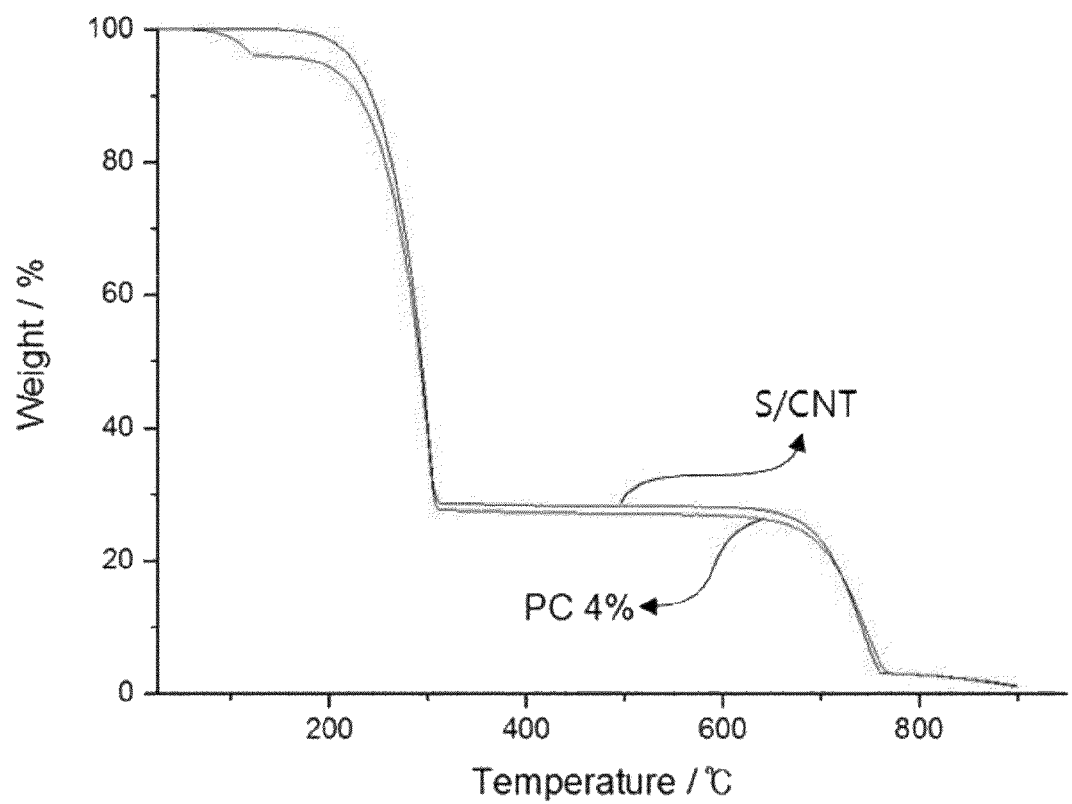

【Figure 2】
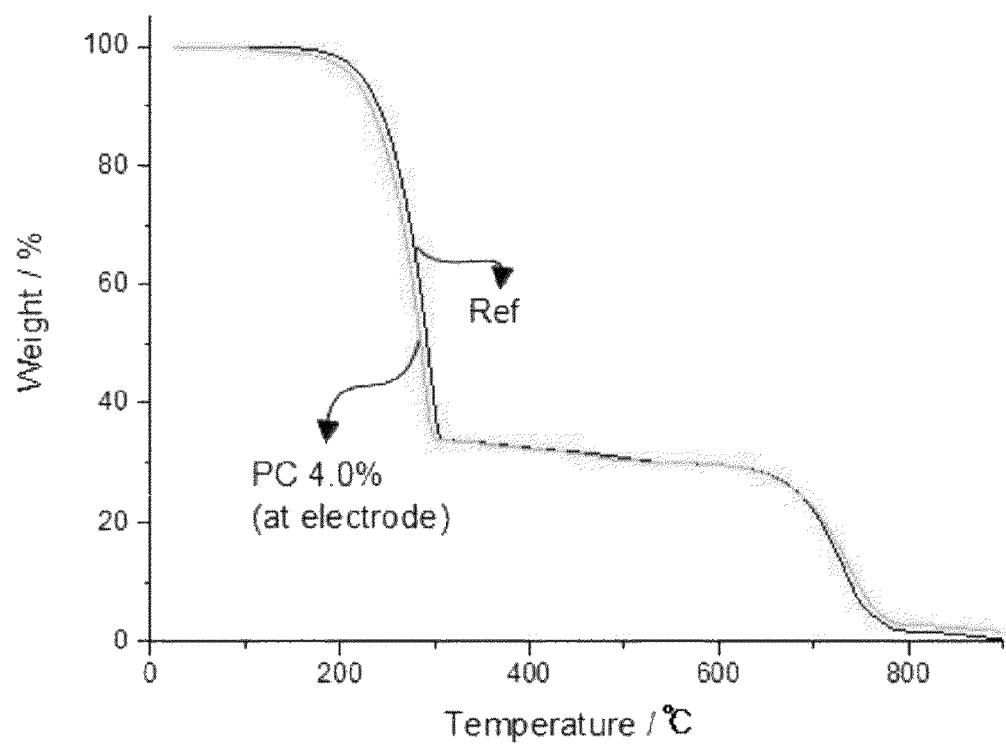

[Figure 3]
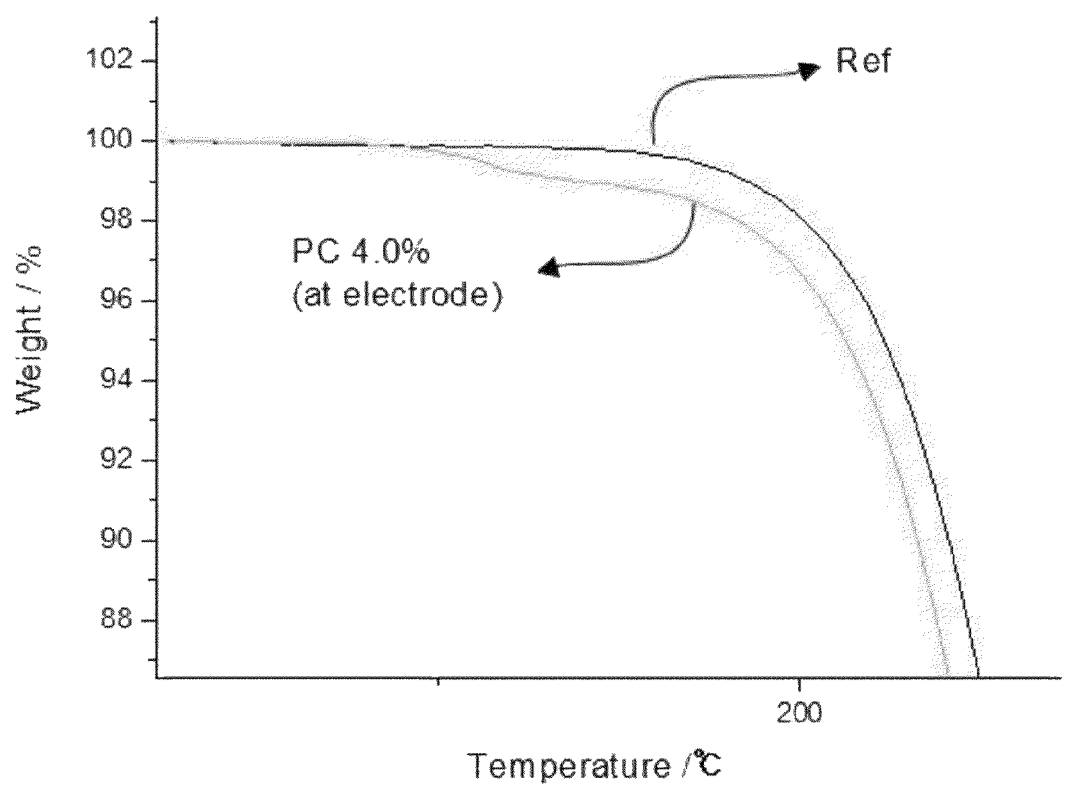

[Figure 4]
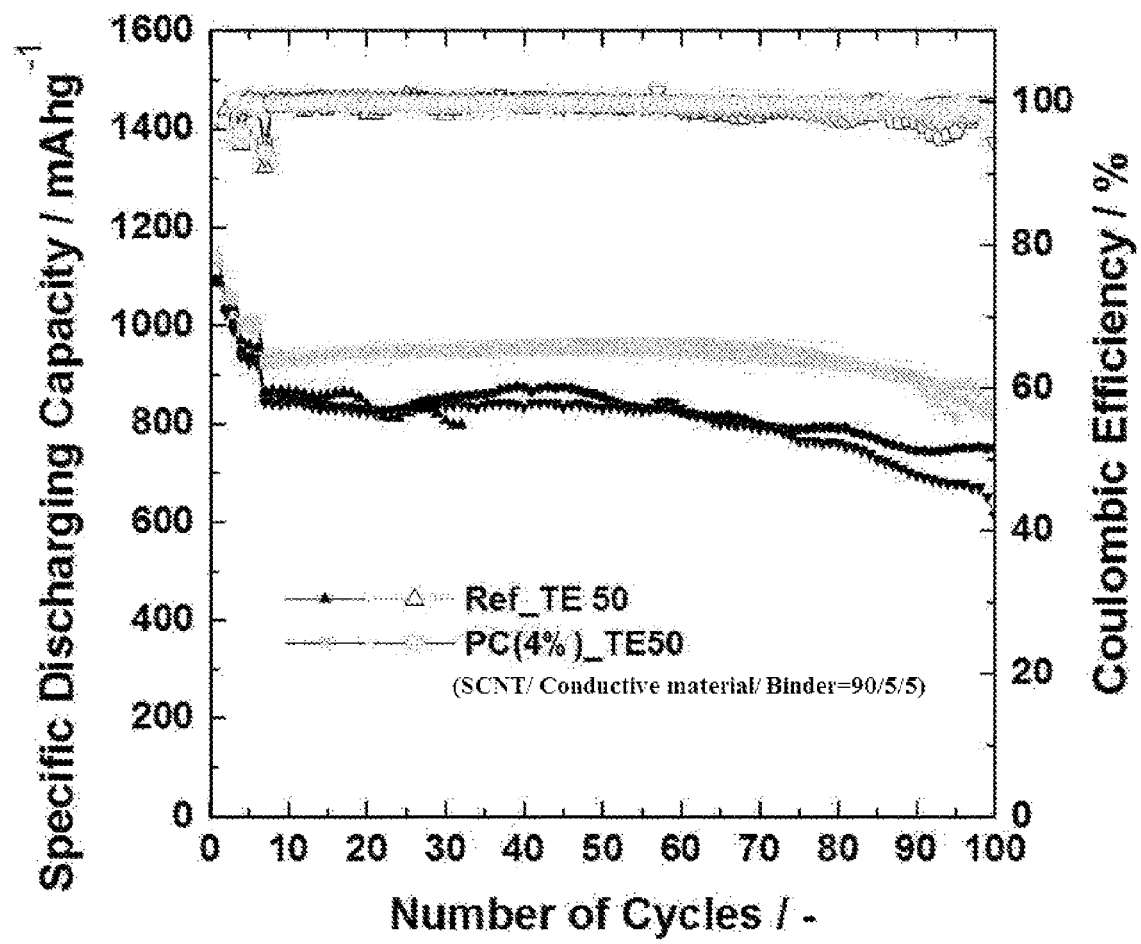

SULFUR-CARBON COMPOSITE, METHOD FOR PREPARING SAME AND LITHIUM SECONDARY BATTERY COMPRISING SAME

TECHNICAL FIELD

The present application claims the benefit of Korean Patent Application No. 10-2017-0142268 filed on Oct. 30, 2017, all the contents of which is incorporated herein by reference.

The present invention relates to a sulfur-carbon composite, a method for preparing the same, and a lithium secondary battery comprising the same.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely.

Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity density and energy efficiency.

Among the secondary batteries currently being applied, the lithium secondary batteries developed in the early 1990s are attracting much attention as there is an advantage in that it has much higher operating voltage and energy density than conventional batteries such as Ni-MH, Ni—Cd, and sulfuric acid-lead batteries using an electrolyte solution in the form of an aqueous solution.

In particular, the lithium-sulfur (Li—S) battery is a secondary battery using a sulfur-based material having an S—S bond (sulfur-sulfur bond) as a positive electrode active material and using lithium metal as a negative electrode active material. The lithium-sulfur battery has advantages in that sulfur, which is the main material of the positive electrode active material, is very rich in resources, is not toxic, and has a low atomic weight. In addition, theoretical discharge capacity of the lithium-sulfur battery is 1675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode (anode) and a reduction reaction of sulfur occurs at the positive electrode (cathode). Sulfur before discharging has an annular S$_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reaction reaction in which the oxidation number of S increases. During this reaction, the sulfur is converted from the cyclic S$_8$ structure to the lithium polysulfide (Li$_2$S$_x$, x=8, 6, 4, 2) having a linear structure by the reduction reaction and eventually, when the lithium polysulfide is completely reduced, lithium sulfide (Li$_2$S) is finally produced. By the process of reducing to each lithium polysulfide, the discharge behavior of the lithium-sulfur battery is characterized by a step-wise discharge voltage unlike lithium ion battery.

However, in the case of lithium-sulfur battery, the problem of rapid capacity reduction according to low coulomb efficiency and charging/discharging due to the problems of the low electrical conductivity, the leaching of lithium polysulfide during charging and discharging, and volume expansion of sulfur should be addressed.

In such a lithium sulfur battery system, when manufacturing a S/CNT composite for a conventional lithium sulfur battery, the non-uniform coating of the sulfur having the non-conductivity and the problem of the conductivity cause a problem that the best performance cannot be exhibited when the battery is driven. Also, there is a problem that after the S/CNT composite is manufactured, the specific surface area is reduced and the reactivity is reduced due to the leaching phenomenon of the lithium polysulfide.

Accordingly, although it was necessary to apply a method of doping or coating a material capable of inhibiting the leaching of lithium polysulfide while maintaining a specific surface area by coating with uniform sulfur, when organic/inorganic materials are introduced to maintain specific surface area and inhibit leaching, generally, overvoltage and a problem that the reactivity is rather reduced were occurred.

Therefore, it is necessary to introduce a method capable of reducing the occurrence of overvoltage and doping a material capable of enhancing the internal reactivity.

(Non-Patent Document 1) "Insight into the Effect of Boron Doping on Sulfur/Carbon Cathode in Lithium-Sulfur Batteries", Chun-Peng Yang, Ya-Xia Yin, Huan Ye, Ke-Cheng Jiang, Juan Zhang, and Yu-Guo Guo*, ACS Appl. Mater. Interfaces, 2014, 6 (11), pp 8789-8795.

DISCLOSURE

Technical Problem

As a result of various studies, the present inventors have confirmed that the doping amount can be controlled by doping a liquid carbonate material that enhances the reactivity between the S/CNT and the electrolyte solution, and controlling the process. That is, the present inventors have confirmed a method of improving the reactivity by doping a certain proportion of liquid propylene carbonate having a high dielectric constant into the composite. Accordingly, in the present invention, it has been confirmed the fact that the two materials (highly volatile solvent and high dielectric constant solvent) easily mixed with each other are mixed with the composite and then subjected to primary drying to remove the volatile solvent, so that the carbonate material can be doped into the composite, and that after the preparation of the electrode, the amount of doping can be controlled through secondary drying, thereby completing the present invention.

Therefore, it is an object of the present invention is to provide a sulfur-carbon composite doped with a material capable of reducing over-voltage occurrence and enhancing internal reactivity by coating the uniform sulfur, even while maintaining the specific surface area and inhibiting the leaching of lithium polysulfide, and a method for preparing the same.

Technical Solution

In order to achieve the above object, the present invention provides a sulfur-carbon composite comprising a porous carbon material; and sulfur present in at least a part of pores of the porous carbon material and on an outer surface of the porous carbon material, wherein an inner surface and the outer surface of the porous carbon material are doped with a carbonate-based compound (e.g., carbonate compound).

In addition, the present invention provides a method for preparing the sulfur-carbon composite comprising the steps of (a) preparing a porous carbon material; (b) mixing a carbonate compound with a volatile solvent to prepare a doping composition; (c) mixing the porous carbon material of step (a) with the doping composition of step (b), and then drying the resulting mixture to prepare a porous carbon material doped with the carbonate compound; and (d) mixing sulfur in the porous carbon material doped with the carbonate compound, and heat-treating the resulting mixture to prepare the sulfur-carbon composite.

In addition, the present invention provides a positive electrode for a lithium-sulfur battery comprising the sulfur-carbon composite.

In addition, the present invention provides a method for manufacturing a positive electrode for a lithium-sulfur battery comprising the steps of (a) preparing a porous carbon material; (b) mixing a carbonate compound with a volatile solvent to prepare a doping composition; (c) mixing the porous carbon material of step (a) with the doping composition of step (b), and then drying the resulting mixture to prepare a porous carbon material doped with the carbonate compound; (d) mixing sulfur in the porous carbon material doped with carbonate compound, and heat-treating the resulting mixture to prepare a sulfur-carbon composite; and (e) mixing the sulfur-carbon composite prepared in step (d) with a conductive material and a binder, and then drying the resulting mixture.

In addition, the present invention provides a lithium-sulfur battery comprising the positive electrode; negative electrode; and electrolyte.

Advantageous Effects

According to the present invention, unlike the prior art, there is an effect that by coating the uniform sulfur, the occurrence of over-voltage can be reduced and the internal reactivity can be increased, even while maintaining the specific surface area and inhibiting the leaching of lithium polysulfide.

DESCRIPTION OF DRAWINGS

FIG. 1 is a graph showing the results of thermal weight analysis of sulfur-carbon composites according to Example of the present invention and Comparative Example.

FIGS. 2 and 3 are graphs showing the results of thermal weight analysis of sulfur-carbon composites according to another Example of the present invention and Comparative Example.

FIG. 4 is a graph showing discharging capacity and life characteristics of lithium-sulfur batteries made of a sulfur-carbon composites of Example of the present invention and Comparative Example.

BEST MODE

Hereinafter, the present invention will be described in detail with reference to the accompanying drawings so that those skilled in the art can easily carry out the present invention. However, the present invention can be embodied in various different forms, and is not limited thereto.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases to each other.

The lithium-sulfur battery uses sulfur as the positive electrode active material and lithium metal as the negative electrode active material. During the discharging of the lithium-sulfur battery, lithium is oxidized at the negative electrode and sulfur is reduced at the positive electrode. At this time, the reduced sulfur is converted to lithium polysulfide by binding with the lithium ions migrated from the negative electrode and finally accompanies the formation of lithium sulfide.

The lithium-sulfur battery has a much higher theoretical energy density than the conventional lithium secondary battery, and sulfur which is used as a positive electrode active material is attracting attention as a next-generation battery, due to the fact that since sulfur is rich in resources and its price is low, the manufacturing cost of battery can be lowered.

Despite these advantages, due to the low electrical conductivity and lithium ion conduction properties of sulfur which is a positive electrode active material, it is difficult to realize all of the theoretical energy density in actual operation.

In order to improve the electrical conductivity of sulfur, a method such as formation of composites with conductive materials such as carbon and polymer, coating and the like has been used. Among the various methods, the sulfur-carbon composite is most often used as a positive electrode active material because it is effective in improving the electrical conductivity of a positive electrode, but it is still not sufficient in terms of charging/discharging capacity and efficiency. The capacity and efficiency of a lithium-sulfur battery can vary depending on the amount of lithium ions delivered to the positive electrode. Therefore, facilitating the transfer of lithium ions into the sulfur-carbon composite is important for high capacity and high efficiency of the battery.

Sulfur-Carbon Composite

Accordingly, in order to secure the effect of improving the reactivity between the sulfur-carbon composite and the electrolyte solution and the capacity and efficiency characteristics of the lithium-sulfur battery, a sulfur-carbon composite is provided in which the inner and outer surfaces of a porous carbon material of a sulfur-carbon composite are doped with a carbonate-based compound (e.g., carbonate compound).

The sulfur-carbon composite of the present invention comprises a porous carbon material; and sulfur present in at least a part of pores of the porous carbon material and the outer surface of the porous carbon material.

The porous carbon material provides a framework in which sulfur which is a positive electrode active material can be uniformly and stably immobilized, and supplements the electrical conductivity of sulfur to enable the electrochemical reaction to proceed smoothly.

The porous carbon material can be generally produced by carbonizing precursors of various carbon materials. The porous carbon material may comprise uneven pores therein, the average diameter of the pores is in the range of 1 to 200 nm, and the porosity may be in the range of 10 to 90% of the total volume of the porous carbon material. If the average diameter of the pores is less than the above range, the pore size is only at the molecular level and impregnation with sulfur is impossible. On the contrary, if the average diameter of the pores exceeds the above range, the mechanical strength of the porous carbon is weakened, which is not preferable for application to the manufacturing process of the electrode.

The shape of the porous carbon material is in the form of sphere, rod, needle, plate, tube, and bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon.

The sulfur may be at least one selected from the group consisting of inorganic sulfur ($S_8$), $Li_2S_n$ ($n \geq 1$), organic sulfur compound and carbon-sulfur polymer [$(C_2S_x)_n$, x=2.5 to 50, n≥2]. Preferably, inorganic sulfur ($S_8$) can be used.

In the sulfur-carbon composite according to the present invention, the weight ratio of sulfur and the porous carbon material may be 9:1 to 5:5, preferably 8:2 to 7:3. If the weight ratio is less than the above range, the content of the porous carbon material increases, and thus the amount of the binder required for preparing the positive electrode slurry is increased. Such an increase in the amount of binder will eventually increase the sheet resistance of the electrode and may serve as an insulator for blocking the electron pass, thereby degrading the cell performance. On the contrary, if the content of sulfur exceeds the above-mentioned weight ratio range, since sulfur is agglomerated with each other and difficult to receive electron, sulfur may be difficult to participate directly in the reaction of the electrode.

In addition, sulfur is located on the surface as well as inside at least a part of the pores of the porous carbon material, and at this time, sulfur may be present in an area of less than 100%, preferably 1 to 95%, more preferably 60 to 90% of the entire outer surface of the porous carbon material. When sulfur is within the above range on the surface of the porous carbon material, it can exhibit the maximum effect in terms of the electron transfer area and the wettability of the electrolyte solution. Specifically, since sulfur is impregnated thinly and evenly on the surface of the porous carbon material in the above range, the electron transfer contact area can be increased during the charging/discharging process. If sulfur is located in the 100% area of the surface of the porous carbon material, the porous carbon material is completely covered with sulfur, so that the wettability of the electrolyte solution is deteriorated and the contact property with the conductive material contained in the electrode are decreased, and thus the electrons are not transmitted and it cannot participate in the reaction.

The sulfur-carbon composite can carry sulfur in a high content due to various sizes of pores in the structure and three-dimensionally interconnected and regularly arranged pores. Therefore, although a soluble polysulfide is produced by an electrochemical reaction, if it can be located inside a sulfur-carbon composite, the structure entangled in three dimensions can be maintained to suppress the collapse of the positive electrode structure even in the case of polysulfide leaching. As a result, the lithium-sulfur battery comprising the sulfur-carbon composite has an advantage that high capacity can be realized even under high loading. The sulfur loading amount of the sulfur-carbon composite according to the present invention may be 1 to 20 mg/cm$^2$.

The sulfur-carbon composite of the present invention is doped with a carbonate-based compound (e.g., carbonate compound) on the inner and outer surfaces of the porous carbon material. The term "doping" as used herein means that the carbonate material with a high boiling point inside the carbon composite remains inside the composite. It does not distinguish between physical and chemical bonds.

The carbonate compound used in the present invention may be selected from the group consisting of propylene carbonate, methylene carbonate, ethylene carbonate, and butylene carbonate.

The content of the carbonate compound used in the present invention may be 0.1 to 10.0 wt. %, preferably 0.5 to 5.0 wt. %, more preferably 1.0 to 3.0 wt. %, based on the total weight of the sulfur-carbon composite. If the content of the carbonate-based compound is less than 0.1 wt. %, it is difficult to control doping and also the effect of doping is insignificant. If the content exceeds 10 wt. %, there is a problem that the degradation of lithium metal is accelerated.

Method for Preparing Sulfur-Carbon Composite and Method for Manufacturing Positive Electrode Comprising Same The sulfur-carbon composite of the present invention is prepared by (a) preparing a porous carbon material; (b) mixing the carbonate-based compound with a volatile solvent to prepare a doping composition; (c) mixing the porous carbon material of step (a) with the doping composition of step (b), and then drying to prepare a porous carbon material doped with the carbonate-based compound; and (d) mixing sulfur in the porous carbon material doped with the above-mentioned carbonate-based compound, and heat-treating it to prepare a sulfur-carbon composite.

First, the method for preparing the sulfur-carbon composite of the present invention comprises step (a) of preparing a porous carbon material.

The characteristics of the porous carbon material used in step (a) are the same as those of the sulfur-carbon composite.

Next, the method for preparing the sulfur-carbon composite of the present invention comprises step (b) of mixing a carbonate-based compound and a volatile solvent to prepare a doping composition.

In the preparing method of the present invention, in order to dope a carbonate-based compound into a composite, a volatile solvent having high volatility is mixed with a carbonate-based compound to prepare a doping composition. As a specific example of such a volatile solvent, at least one selected from the group consisting of ethanol and THF can be used.

The characteristics of the carbonate-based compound used in step (b) are the same as those of the sulfur-carbon composite.

Next, the method for preparing the sulfur-carbon composite of the present invention comprises step (c) of mixing the porous carbon material of step (a) with the doping composition of step (b) and drying to prepare the porous carbon material doped with the carbonate-based compound In the method for preparing the sulfur-carbon composite of the present invention, the drying in step (c) may be carried out at 70 to 150° C. for 15 minutes to 1 hour. When the drying temperature and drying time of the sulfur-carbon composite satisfy the above range, the volatile solvent is sufficiently volatilized and thus the carbonate-based compound can be uniformly doped into the composite Next, the method for preparing the sulfur-carbon composite of the present invention comprises step (d) of mixing sulfur in the porous carbon material doped with the above-mentioned carbonate-based compound, and then heat-treating to prepare a sulfur-carbon composite.

In step (d), when mixing sulfur and the porous carbon material, the weight ratio of sulfur and the porous carbon material may be 9:1 to 5:5, preferably 8:2 to 7:3. If the weight ratio is less than the above range, the content of the porous carbon material increases, and thus the amount of the binder required for preparing the positive electrode slurry is increased. Such an increase in the amount of binder will eventually increase the sheet resistance of the electrode and may serve as an insulator for blocking the electron pass, thereby degrading the cell performance. On the contrary, if the content of sulfur exceeds the above-mentioned weight ratio range, since sulfur is agglomerated with each other and difficult to receive electron, sulfur may be difficult to participate directly in the reaction of the electrode.

In step (d), when preparing the sulfur-carbon composite by heat-treating the mixed sulfur and porous carbon material to carry sulfur on the porous carbon material, a typical heat treatment method used in the art can be used. Preferably, the heat treatment can be performed through melt diffusion. Although there is no particular limitation, the melt diffusion can be preferably proceeded at 140° C. for 15 minutes to 1 hour.

In addition, the positive electrode of the present invention is manufactured by (a) preparing a porous carbon material; (b) mixing the carbonate-based compound with a volatile solvent to prepare a doping composition; (c) mixing the porous carbon material of step (a) with the doping composition of step (b), and then drying to prepare a porous carbon material doped with the carbonate-based compound; (d) mixing sulfur in the porous carbon material doped with the above-mentioned carbonate-based compound, and heat-treating it to prepare a sulfur-carbon composite; and (e) mixing the sulfur-carbon composite prepared in step (d) with a conductive material and a binder, and then drying them.

First, in the method of manufacturing the positive electrode for the lithium-sulfur battery of the present invention, steps (a) to (d) are the same as those of the above-described method for preparing a sulfur-carbon composite.

The method of manufacturing the positive electrode for the lithium-sulfur battery of the present invention comprises step (e) of mixing the sulfur-carbon composite prepared in step (d) with a conductive material and a binder, and then drying them.

The drying in step (e) may be carried out at 40 to 70° C. for 4 to 24 hours. If the drying temperature is less than 40° C., the drying effect is insignificant. If the drying temperature is more than 70° C., there is a problem that sulfur may be volatilized.

Positive Electrode for Lithium-Sulfur Battery

The sulfur-carbon composite disclosed in the present invention can be preferably used as a positive electrode active material of a lithium-sulfur battery.

The positive electrode is manufactured by applying and drying a composition for forming a positive electrode active material layer on a positive electrode current collector. The composition for forming the positive electrode active material layer is prepared by mixing the above-described sulfur-carbon composite with a conductive material and a binder, followed by drying at 40 to 70° C. for 4 to 12 hours.

Specifically, a conductive material may be added to the positive electrode composition to impart additional conductivity to the prepared positive sulfur-carbon composite. The conductive material plays a role in allowing electrons to move smoothly within the positive electrode, and is not particularly limited as long as it is excellent in conductivity and can provide a large surface area without causing chemical change in the battery, but preferably a carbon-based material is used.

The carbon-based material may be any one selected from the group consisting of graphite-based materials such as natural graphite, artificial graphite, expanded graphite and graphene, activated carbon-based material, carbon black-based materials such as channel black, furnace black, thermal black, contact black, lamp black and acetylene black; carbon fiber-based materials, carbon nanostructures such as carbon nanotubes (CNT) and fullerene, and mixtures thereof.

In addition to the carbon-based materials, metallic fibers such as metal mesh; metallic powder such as copper (Cu), silver (Ag), nickel (Ni) and aluminum (Al); or organic conductive materials such as polyphenylene derivatives can also be used depending on the purpose. The conductive materials may be used alone or in combination.

Also, in order to provide the positive electrode active material with an adhesion to the current collector, the positive electrode composition may further comprise a binder. The binder should be well dissolved in the solvent, and should not only constitute the conductive network between the positive electrode active material and the conductive material, but also have a proper impregnation property into the electrolyte solution.

The binder applicable to the present invention may be any binder known in the art, and specifically may be, but is not limited to, at least one selected from the group consisting of fluororesin-based binders comprising polyvinylidene fluoride (PVdF) or polytetrafluoroethylene (PTFE); rubber-based binders comprising styrene-butadiene rubber, acrylonitrile-butadiene rubber, and styrene-isoprene rubber; cellulose-based binders comprising carboxymethylcellulose (CMC), starch, hydroxypropylcellulose, and regenerated cellulose; polyalcohol-based binders; polyolefin-based binders comprising polyethylene and polypropylene; polyimide-based binders, polyester-based binders, and silane-based binders, acrylate-based binder or acrylate-based copolymer binder or mixtures or copolymers of two or more thereof.

The content of the binder resin may be, but is not limited to, 0.5 to 30 wt. % based on the total weight of the positive electrode for the lithium-sulfur battery. If the content of the binder resin is less than 0.5 wt. %, the physical properties of the positive electrode may be deteriorated and thus positive electrode active material and the conductive material can be broken away. If the content exceeds 30 wt. %, the ratio of the active material and the conductive material in the positive electrode is relatively reduced, and the battery capacity can be reduced.

A solvent for preparing a positive electrode composition for a lithium-sulfur battery in a slurry state should be easy to dry and should dissolve the binder well, and most preferably, the solvent is a solvent which capable of keeping the positive electrode active material and the conductive material in a dispersed state without dissolving them. If the solvent dissolves the positive electrode active material, since the specific gravity (D=2.07) of sulfur in the slurry is high, sulfur is submerged in the slurry and thus sulfur is concentrated in the collector during the coating process and there is a tendency that problems occur in the conductive network, thereby occurring problems in the operation of the battery.

The solvent according to the present invention may be water or an organic solvent. The organic solvent may be an organic solvent comprising at least one selected from the group consisting of dimethylformamide, isopropyl alcohol, acetonitrile, methanol, ethanol, and tetrahydrofuran.

The positive electrode composition may be mixed by stirring by a conventional method using conventional mixers such as a latex mixer, a high-speed shear mixer, a homomixer, or the like.

The positive electrode composition may be applied to the current collector and dried in a vacuum to form a positive electrode for the lithium-sulfur battery. The slurry can be coated on the current collector with an appropriate thickness according to the viscosity of the slurry and the thickness of the positive electrode to be formed, and can be appropriately selected within a range of preferably 10 to 300 μm.

In this case, there is no limitation on the method of coating the slurry, and the method of coating the slurry may comprise, for example, a doctor blade coating, a dip coating, a gravure coating, a slit die coating, a spin coating, a comma coating, a bar coating, a reverse roll coating, a screen coating, a cap coating method and the like.

The drying condition for removing the solvent and water after the coating of the slurry is generally carried out at a temperature of 80° C. or less, which will not volatilize sulfur, more specifically, at a temperature of 40 to 70. The drying time can usually proceed overnight.

The positive electrode current collector generally has a thickness of 3 to 500 μm and is not particularly limited as long as it has high conductivity without causing chemical change in the battery. For example, a conductive metal such as stainless steel, aluminum, copper, or titanium, etc., can be used, and preferably an aluminum current collector can be used. The positive electrode current collector may be formed in various forms such as film, sheet, foil, net, porous body, foam or nonwoven fabric.

Lithium-Sulfur Battery

As one embodiment of the present invention, the lithium-sulfur battery may comprise a positive electrode for the lithium-sulfur battery as described above; a negative electrode comprising a lithium metal or lithium alloy as a negative electrode active material; a separator interposed between the positive electrode and the negative electrode; and electrolyte which is impregnated to the negative electrode, the positive electrode and the separator and comprises a lithium salt and an organic solvent.

The negative electrode may comprise a material capable of reversibly intercalating or deintercalating lithium ion (Lit), a material capable of reversibly forming lithium containing compounds by reacting with lithium ion, or lithium metal or lithium alloy, as the negative electrode active material. The material capable of reversibly intercalating or deintercalating lithium ion can be, for example, crystalline carbon, amorphous carbon, or a mixture thereof. The material capable of reacting with lithium ion to reversibly form lithium containing compounds may be, for example, tin oxide, titanium nitrate or silicon. The lithium alloy may be, for example, an alloy of lithium and a metal selected from the group consisting of Na, K, Rb, Cs, Fr, Be, Mg, Ca, Sr, Ba, Ra, Al and Sn.

Also, in the process of charging/discharging lithium-sulfur battery, sulfur used as a positive electrode active material can be changed to an inactive material and then attached to the surface of the lithium negative electrode. As mentioned above, the inactive sulfur means sulfur which is no longer able to participate in the electrochemical reaction of the positive electrode through various electrochemical or chemical reaction. The inactive sulfur formed on the surface of the lithium negative electrode also has the advantage of acting as a protective layer of the lithium negative electrode. Therefore, the lithium metal and the inactive sulfur formed on the lithium metal, such as lithium sulfide, may be used as a negative electrode.

The negative electrode of the present invention may further comprise a pretreatment layer made of a lithium ion conductive material, and a lithium metal protective layer formed on the pretreatment layer, in addition to the negative electrode active material.

The separator interposed between the positive electrode and the negative electrode separates or insulates the positive and negative electrodes from each other, allows the transport of lithium ions between the positive and negative electrodes, and can be made of porous nonconductive or insulating materials. The separator may be an independent member such as a film or a thin film as an insulator having high ion permeability and mechanical strength, or may be a coating layer added to the positive electrode and/or the negative electrode. Also, when a solid electrolyte such as a polymer is used as an electrolyte, the solid electrolyte may also serve as a separator.

The separator preferably has a pore diameter of 0.01 to 10 μm and a thickness of 5 to 300 μm. Glass electrolyte, polymer electrolyte or ceramic electrolyte, etc., can be used as the separator. For example, olefin-based polymers such as polypropylene having chemical resistance and hydrophobicity, a sheet or nonwoven fabric made of glass fiber or polyethylene, Kraft paper and the like are used. Representative examples currently available on the market comprise Celgard series (Celgard® 2400, 2300 product from Hoechest Celanese Corp.), polypropylene separator (product from Ube Industries Ltd. or product from Pall RAI), polyethylene series (Tonen or Entek), and the like.

The electrolyte separator in the form of solid may comprise less than about 20% by weight of non-aqueous organic solvent. In this case, an appropriate gelling agent may be comprised to reduce the fluidity of the organic solvent. Representative examples of such gelling agent may comprise polyethylene oxide, polyvinylidene fluoride, and polyacrylonitrile, etc.

The electrolyte impregnated to the negative electrode, the positive electrode, and the separator is composed of a lithium salt and an electrolyte solution as a non-aqueous electrolyte containing a lithium salt. Non-aqueous organic solvent, organic solid electrolyte, and inorganic solid electrolyte, etc., are used as the electrolyte solution.

The lithium salt of the present invention is a substance which can be easily dissolved in a non-aqueous organic solvent, and for example, may comprise at least one selected from the group consisting of LiSCN, LiCl, LiBr, LiI, $LiPF_6$, LiBF$_4$, LiSbF$_6$, LiAsF$_6$, LiB$_{10}$Cl$_{10}$, LiCH$_3$SO$_3$, LiCF$_3$SO$_3$, LiCF$_3$CO$_2$, LiClO$_4$, LiAlCl$_4$, LiC(CF$_3$SO$_2$)$_3$, LiN(FSO$_2$)$_2$, LiN(CF$_3$SO$_2$)$_2$, LiN(C$_2$F$_5$SO$_2$)$_2$, LiN(SFO$_2$)$_2$, LiN(CF$_3$CF$_2$SO$_2$)$_2$, lithium chloroborane, lithium lower aliphatic carboxylate, lithium tetraphenyl borate, lithium imide, LiFSI, LiTFSI and mixtures thereof.

The concentration of the lithium salt may be 0.2 to 2 M, preferably 0.6 to 2 M, more preferably, 0.7 to 1.7 M, depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion (Lit) may be reduced.

The non-aqueous organic solvent should dissolve the lithium salt well, and the non-aqueous organic solvent of the present invention may comprise, for example, aprotic organic solvents such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO4-Li$_2$S—SiS$_2$ may be used.

To the electrolyte of the present invention, for example, pyridine, triethylphosphite, triethanolamine, cyclic ether, ethylene diamine, glyme-based compound, hexamethyl phosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charge-discharge characteristics, flame retardancy, and the like. In some cases, a halogen-containing solvent such as carbon tetrachloride, ethylene trifluoride or the like can be also added for the purpose of imparting nonflammability, and a carbon dioxide gas can be further comprised for the purpose of improving storage characteristics at a high temperature, and FEC (fluoro-ethylene carbonate), PRS (propene sultone), FPC (fluoro-propylene carbonate) and the like can be further comprised.

The electrolyte may be used as a liquid electrolyte and also as an electrolyte separator form in a solid state. When being used as a liquid electrolyte, a separator made of porous glass, plastic, ceramic, or polymer is further comprised as a physical separator having a function of physically separating the electrode.

Hereinafter, preferred examples will be presented to facilitate understanding of the present invention. However, it will be apparent to those skilled in the art that the following examples are illustrative of the present invention and that various changes and modifications can be made within the scope and spirit of the present invention, and that such variations and modifications are within the scope of the appended claims

EXAMPLES

Preparation of Sulfur-Carbon Composite

Example 1

0.3 g of propylene carbonate and 6 g of ethanol were mixed to prepare a doping composition.

0.5 g of the carbon nanotubes was stirred for 15 minutes in the prepared dope composition, and then the stirred composite slurry was dried in an oven at 80° C. for 30 minutes to prepare a carbon nanotube doped with a carbonate-based compound.

The weight of the carbon nanotubes doped with the carbon-based compound with the elapse of the drying time was measured and is shown in Table 1 below.

TABLE 1

|  | After 15 minutes | After 25 minutes | After 30 minutes |
|---|---|---|---|
| CNT weight (g) | 0.58 | 0.57 | 0.57 |

Subsequently, 1.5 g of the carbonate-based compound-doped carbon nanotube prepared above and 1.5 g of sulfur were uniformly mixed and then melt-diffused at 155° C. for 30 minutes to prepare a sulfur-carbon composite.

Example 2

By using the sulfur-carbon composite produced in Example 1, a slurry was prepared by a weight ratio of sulfur-carbon composite:conductive material:binder=90:5:5, and then coated on a current collector of aluminum foil having a thickness of 20 μm to prepare an electrode. At this time, carbon black was used as the conductive material, and styrene butadiene rubber and carboxymethyl cellulose was used as the binder. The prepared electrode was dried overnight in a oven at 50° C. to prepare a positive electrode for a lithium-sulfur battery.

The weight of sulfur-carbon composite in the battery depending on the elapse of the drying time was measured and is shown in Table 2 below.

TABLE 2

|  | After 4 hours | After 12 hours |
|---|---|---|
| Composite weight (g) | 2.06 | 2.03 |

From Table 2, it can be seen that the propylene carbonate is comprised in the sulfur-carbon composite at about 1.5 to 3 wt. %.

Comparative Example 1

1.5 g of sulfur was uniformly mixed in 0.5 g of the dried carbon nanotubes and melt diffusion was carried out at 155° C. for 30 minutes to prepare a sulfur-carbon composite.

Comparative Example 2

By using the sulfur/carbon composite produced in Comparative Example 1, a slurry was prepared by a weight ratio of carbon nanotube:conductive material:binder=90:5:5, and then coated on a current collector of aluminum foil having a thickness of 20 μm to prepare an electrode. At this time, carbon black was used as the conductive material, and styrene butadiene rubber and carboxymethyl cellulose was used as the binder. The prepared electrode was dried overnight in a oven at 50° C. to prepare a positive electrode for a lithium-sulfur battery.

The weight of the composite in the battery depending on the elapse of the drying time was measured and is shown in Table 2 below.

TABLE 3

|  | After 4 hours | After 12 hours |
|---|---|---|
| Composite weight (g) | 2.0 | 2.0 |

Experimental Example 1: Thermogravimetric Analysis (TGA) of Doped Sulfur-Carbon Composite TGA (Thermogravimetric analysis, Mettler-Toledo, TGA2) analysis was performed on the sulfur-carbon composite doped with the carbonate-based compound prepared in Example 1 and the sulfur-carbon composite prepared in Comparative Example 1, and the results are shown in FIG. 1.

As shown in FIG. 1, it was found that about 4% of the carbonate compound is doped in the sulfur-carbon composite prepared in Example 1.

In addition, TGA analysis was performed on the positive electrode prepared in Example 2 and the positive electrode prepared in Comparative Example 2, and the results are shown in FIG. 2, and an enlarged portion is shown in FIG. 3.

As shown in FIG. 2 and FIG. 3, it can be seen that a weight loss of about 4% occurs in the electrode manufactured in Example 2. Through this, it was found that the carbonate compound is doped by about 4%

Experimental Example 2: Evaluation of Battery Performance

A lithium-sulfur battery coin cell was fabricated by using the positive electrode prepared in Example 2 and the positive electrode prepared in Comparative Example 2, using polyethylene as a separator and using lithium foil having a thickness of 50 μm as a negative electrode. At this time, the coin cell comprised an electrolyte prepared by dissolving 1 M LiFSI and 1% $LiNO_3$ in an organic solvent consisting of diethylene glycol dimethyl ether and 1,3-dioxolane (DEGDME:DOL=6:4 (volume ratio).

The capacity of the manufactured coin cell was measured from 1.8 to 2.6 V using a charging/discharging measuring device. Specifically, the cell was operated by repeating 100 times of the cycle of 0.1 C/0.1 C. 0.3 C/0.3 C discharging and 0.5 C/0.5 C charging/discharging. The results obtained at this time are shown in FIG. 4.

Referring to FIG. 4, it can be seen that the lithium-sulfur battery using the positive electrode made of the sulfur-carbon composite of Example 1 improves the discharging capacity and life characteristics as compared to the lithium-sulfur battery using the positive electrode made of the sulfur-carbon composite of Comparative Example 1. Through this, it was confirmed that when a carbonate-based compound is doped in a composite as in the present invention, uniform sulfur is coated to maintain specific surface area and not only the leaching of lithium polysulfide can be suppressed, but also the occurrence of over-voltage is reduced and the internal reactivity is increased.

The invention claimed is:

1. A sulfur-carbon composite, comprising:
a porous carbon material,
wherein the porous carbon material is doped with a carbonate compound,
wherein the carbonate compound is at least one selected from the group consisting of propylene carbonate, and butylene carbonate, and
wherein a content of the carbonate compound is 0.5 to 5.0 wt. % based on a total weight of the sulfur-carbon composite.

2. The sulfur-carbon composite according to claim 1, wherein the content of the carbonate compound is 1.0 to 3.0 wt. % based on the total weight of the sulfur-carbon composite.

3. The sulfur-carbon composite according to claim 1, wherein the sulfur and the porous carbon material are present in the sulfur-carbon composite in a weight ratio of sulfur to carbon of 9: 1 to 1:1.

4. The sulfur-carbon composite according to claim 1, wherein the porous carbon material is at least one selected from the group consisting of graphite, graphene, carbon black, carbon nanotube, carbon fiber, and activated carbon.

5. A positive electrode for a lithium-sulfur battery comprising the sulfur-carbon composite of claim 1.

6. A lithium-sulfur battery, comprising:
the positive electrode of claim 5;
a negative electrode; and
an electrolyte,
wherein the electrolyte comprises at least one non-aqueous organic solvent selected from the group consisting of N-methyl-2-pyrrolidone, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, tetrahydrofuran derivatives, ether, methyl propionate, and ethyl propionate.

\* \* \* \* \*